United States Patent Office 3,492,164
Patented Jan. 27, 1970

3,492,164
FUEL CELL ELECTRODE
William R. Wolfe, Jr., Wilmington, Del., assignor to E. I. du Pont de Nemours and Company, Wilmington, Del., a corporation of Delaware
No Drawing. Filed Jan. 17, 1967, Ser. No. 609,777
Int. Cl. H01m 27/04
U.S. Cl. 136—86                             13 Claims

ABSTRACT OF THE DISCLOSURE

A relatively inexpensive catalyst for a fuel cell electrode, particularly useful with acid electrolytes, is an acid-insoluble solid material composed of at least one oxide of molybdenum and at least one sulfurated compound of molybdenum, said oxide having the formula $MoO_x$, wherein $x$ has a value of 2–2.88, at least the exposed regions of said solid material containing said sulfurated compound of molybdenum, the ratio of oxygen-to-sulfur in said solid material being 36:1–1:36.

RELATED APPLICATIONS

The following applications are referred to in this specification:
Ser. No. 348,165, filed Feb. 28, 1964; Ser. No. 404,435, filed Oct. 16, 1964; Ser. No. 530,295, filed Feb. 28, 1966.

SUMMARY OF INVENTION

A fuel cell electrode having as a catalyst an acid-insoluble solid material composed of at least one oxide of molybdenum and at least one sulfurated compound of molybdenum, said oxide having the formula $MoO_x$, wherein $x$ has a value of 2–2.88, at least the exposed regions of said solid material containing said sulfurated compound of molybdenum, the ratio of oxygen-to-sulfur in said solid material being 36:1–1:36.

This invention relates to improved fuel cells and, more particularly, the invention relates to the anodes used in fuel cells.

Fuel cell, as used herein, refers to a device capable of generating electrical energy from the oxidation of a fuel. Specifically, a fuel cell comprises a housing, two electrically conductive electrodes consisting of or impregnated with catalytic material, connecting means associated with each electrode for establishing electrical contact with an external circuit and an electrolyte which acts as a transferring medium for ions. An oxidizing gas such as air is supplied to the oxidant electrode (the cathode) and a fuel, such as hydrogen, methanol, formaldehyde, etc. is supplied to the fuel electrode (the anode). At the cathode electrons are consumed to convert the oxidant into ions; and at the anode, the fuel is oxidized with the release of electrons. There is, therefore, a net flow of electrons from the anode to the cathode through the external electrical-conductive circuit. If the electrolyte is alkaline, then negative ions migrate to the anode to take part in the oxidation reaction. If the electrolyte is acid, then positive ions migrate to the cathode to take part in the reduction reaction.

Heretofore, the most successful anodes for use in fuel cells have either been formed of very expensive materials or have contained such materials as catalysts. Platinum, palladium, rhodium, silver and compounds of such materials have been used as anode catalysts and then tended to make the fuel cell commercially unattractive. Although less expensive materials have been suggested, none has provided sufficiently low cost per unit power, particularly for use with the more desirable acid electrolytes, to compete with platinum and the like for use as anodic catalysts in fuel cells.

In its broadest sense, the present invention provides a fuel cell in which the anode catalyst is an acid-insoluble solid material (substantially insoluble in a 15 percent aqueous solution of hydrochloric acid at a temperature of 90° C.) composed of at least one oxide of molybdenum and at least one sulfurated compound of molybdenum, the oxide having the formula $MoO_x$, wherein $x$ has a value of 2–2.88, and wherein at least the exposed regions of the solid material contain the sulfurated compound of molybdenum, the ratio of oxygen to sulfur in the acid-insoluble solid material being 36:1–1.36, preferably 10:1–1:3.

The sulfurated compound of molybdenum can be either insoluble molybdenum sulfide or the previously defined molybdenum oxide having sulfur atoms partially substituted for oxygen atoms in the crystal latttice. Locating the sulfurated molybdenum compound in the regions of the solid material that are exposed to (in contact with) the electrolyte is important in the operability of the catalyst. Thus, when the sulfurated compound is molybdenum disulfide, it should be present as a coating or layer on the oxide of molybdenum so that it is distinguishable, microscopically or analytically, from the interior of the solid material. When sulfur is partially substituted for oxygen in the lattice of the oxide, such substitution should occur primarily in the outer layer of the oxide. When such substitution occurs, there is clear continuity between the outer and the inner regions of the solid material. In either case, there must be such intimacy between the outer and the inner layers that would facilitate the conduction of the electrons between the regions. This is in contrast to the simple mixture of molybdenum oxide particles and molybdenum sulfide particles where there exists resistance to electrical conduction at the interfaces of the particles.

The catalyst can be composed of individual particles of the acid-insoluble solid material, as defined previously, so that each particle is catalytically active. Alternatively, the catalyst can be a relatively large sheet of the oxide of molybdenum having the sulfurated compound of molybdenum in its outer layer. This latter structure provides the minimum sulfur content that can be present in the catalyst. In a sheet of the oxide having a monomolecular outer region composed of the sulfurated compound, e.g. molybdenum disulfide of monomolecular thickness over a molybdenum dioxide sheet, the sulfur content would be about 0.4 weight percent which corresponds to an oxygen:sulfur ratio of 36:1. The maximum sulfur content would occur in tiny platelets of the oxide of molybdenum in which the outer regions are predominantly sulfurated or in larger molybdenum oxide particles in which sulfuration penetrates deeply but not completely. In both of these latter cases, the catalyst would be operable in the present invention and the oxygen:sulfur ratio would be about 1:36.

CATALYST PREPARATION

Generally, any method for incorporating oxides with sulfides or oxysulfides is suitable for the preparation of the catalyst used in this invention. The preferred method of preparing the catalyst involves treating a molybdate such as ammonium heptamolybdate $$[(NH_4)_6Mo_7O_{24} \cdot 4H_2O]$$

with a sulfurizing compound such as elemental sulfur or a reactive sulfide, e.g. hydrogen sulfide, in a reducing atmosphere to convert the metal salt to the oxide of molybdenum coated with the oxysulfide or sulfide of molybdenum. The product normally contains some elemental sulfur as well which can be removed if desired. The conversion can be carried out on the surface of a conductor, e.g. on porous carbon, to form the electrode with its associated catalyst and thus, avoid a subsequent step of applying catalyst to the electrode.

Other methods of producing the catalyst for use in this invention involve oxidizing molybdenum disulfide or sulfurizing an oxide of molybdenum by reaction with sulfur or hydrogen sulfide or by heating a mixture of sulfides and oxides at elevated temperatures, e.g. 400–600° C. Still another method involves treating a suspension of the oxide with a solution of the sulfide to yield the insoluble product. Where the oxide of molybdenum is used as a starting material in the preparation of the catalyst, it can be any of the stoichiometric oxides ($MoO_2$, $MoO_3$) or non-stoichiometric oxides ($Mo_4O_{11}$, $Mo_8O_{23}$, $Mo_9O_{26}$, etc.). However, the formulation of the oxide of molybdenum in the final product will range from $MoO_2$ to $Mo_8O_{23}$, i.e. $MoO_x$ where $x$ is 2–2.88.

Still another possible method for preparing the catalytic material involves intimately mixing the oxide of molybdenum with molybdenum disulfide. Simple mixing by hand or by tumbling the materials in a drum does not produce material that is operable as a catalyst no matter how thorough the mixing. However, milling them with large (½-inch) ceramic balls may produce sufficiently high energy to yield an operable catalyst, i.e. may produce sufficient force and heat to bring about intimate mixing of the compounds.

The chemical composition of the acid-insoluble solid material produced by the foregoing methods may be determined by X-ray diffraction techniques or by conventional chemical analysis or other methods known to those skilled in the art. Wet analytical data provide sulfur content and the average valence of molybdenum; and the X-ray analysis discloses the general species present and the amount of combined sulfur. The structure of the material, wherein the outer regions of the particles contain sulfurated compounds of molybdenum, may be verified by examination using techniques that involve the use of the electron microscope or the electron beam microprobe or the like. It should be understood that all the production methods may produce elemental sulfur along with the desirable catalytic material. This free sulfur is not included in determining the oxygen-to-sulfur ratio set forth in the examples and claims.

It will be apparent that where sheets of the catalyst are to be produced, the processes of production are more limited. The preferred method is to treat a sheet of the oxide with sulfur, hydrogen sulfide or other reactive sulfide so that the exposed regions of the sheet are sulfurated. It is also possible to produce the sheets by compressing previously produced particles of the catalytic material.

Where particles of the acid-insoluble solid material, as defined previously, are produced, such particles will range in size from one to ten microns. However, the invention is not so limited since smaller and larger particles will also form active catalysts. It should also be pointed out that size reduction after the catalyst has been formed is not desirable. Grinding or milling the acid-insoluble solid material tends to change the sulfide distribution in the particle and may relocate the sulfurated regions inwardly.

ANODE PREPARATION

The anode of this invention is preferably composed of a base stratum that is usually an electrically conductive material, chemically resistant to the electrolyte, which supports the previously described catalytic material. Although any electrically conductive material including gold and those metals of Group VIII of the Periodic Table that are resistant to the electrolyte would be operable, it is preferred to use materials that are relatively inexpensive in order to retain the basic advantages of the catalyst. Thus, some transition metals, like tungsten and tantalum, may be used as such or in alloys thereof, e.g. stainless steel, nickel-aluminum alloys, etc. In addition, suitable electrodes may be formed from metal oxides, carbon, carbides, conductive ceramics, conductive polymeric compositions or the metal-silicon combinations disclosed in U.S. patent application Ser. No. 404,435, filed Oct. 16, 1964. The electrode base stratum may be used in sheet, rod or cylinder form or, preferably, in the form of a porous or foraminous base e.g. screen, mesh, wool, etc. to provide maximum surface area.

The catalytic material may be incorporated in a binder and the combination may be applied to the electrically conductive base stratum under pressure. As the binder material, such polymers as chlorinated butyl rubber, polystyrene, polymethyl methacrylate, polyethylene terephthalate, polyvinyl, chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

In the most desirable system, the catalytic material is used as part of a bipolar conductor system. Bipolar conductor systems offer the following advantages: the fuel cell design is simplified; the construction can be compact; and external cell connection losses are minimized. These advantages are discussed in 15th Annual Power Sources Conference Proceedings, 1961; pages 31–32 of "Liquid Alkaline Fuel Cells" by P. G. Grimes et al. The bipolar electrode may be formed from the materials useful in the present invention by depositing the catalytic material on a support of porous graphite or carbon or the like, the supporting material acting as one side (the anode) of a conductor while the reverse side acts as the cathode.

It should be understood, however, that it is not necessary that the catalytic material be incorporated with the electrode. Particles of the catalytic material may be suspended in the anolyte (the electrolyte in contact with the anode) as described in U.S. patent application Ser. No. 348,165, filed Feb. 28, 1964. Alternatively, the catalytic material, being electrically conductive, can be used as the electrode itself. Specifically, it can be pressed, with or without a polymeric binder, into a form for receiving an electrical lead; or it can be used in particulate form in a gas dispersion tube.

ELECTROLYTES

The electrolytes used in the fuel cells and half cells of this invention can be any of those commonly used which are compatible with the particular fuels, oxidants, permeable membranes, etc. being used. They will usually be aqueous mixtures of adequate conductivity for the ions involved in the half cell reactions. The useful aqueous electrolytes include solutions of the alkali metal hydroxides, e.g. potassium hydroxide, sodium hydroxide; the common acids, e.g. sulfuric acid, phosphoric acid, hydrochloric acid; alkaline salts, e.g. the chlorides, sulfates or carbonates of sodium, potassium or lithium; etc. The concentrations involved will usually be chosen for high conductivity and convenient handling. For the purpose of the present invention, acidic electrolytes are preferred. In such electrolytes, gaseous waste products are produced which are readily removed. Specifically, 5–45% sulfuric acid, 10–85% phosphoric acid and 5–15% hydrochloric acid are recommended.

While it will usually be desirable to use the same electrolyte for the fuel and oxidant half cells in the fuel cell arrangements of this invention, the use of a common electrolyte is not essential. Two different electrolytes can be used by incorporating in the fuel cell design a suitable membrane which separates the electrolytes but permits adequate flow of ions between the half cells. A preferred class of ion-exchange membranes for use in the fuel cell of this invention are thin films of fluorinated copolymers having pendant sulfonic acid groups, preferably the copolymers of trifluorovinyl sulfonic acid and fluorinated ethylenes, as disclosed in copending U.S. patent application Ser. No. 530,295, filed Feb. 28, 1966. By using a suitable ion-permeable membrane, one half cell can utilize a soluble fuel or oxidant in one electrolyte while the other half cell utilizes a gaseous or liquid fuel or oxidant, the membrane serving to prevent migration of the soluble fuel or oxidant to the other electrode.

FUELS AND OXIDANTS

While the catalysts described herein are particularly useful with low molecular weight hydrogenous fuels, the invention is not so limited. Besides hydrogen, the useful fuels include nitrogen-containing fuels like ammonia and hydrazine; oxygenated hydrocarbon fuels like formaldehyde, methanol, formic acid, and carbon monoxide. The fuel may consist of one or more of the foregoing materials. For example, natural gas, which is a mixture of hydrogen and methane, and reformed natural gas, which is a mixture of hydrogen, methane and carbon monoxide, are useful fuels. The selection of the particular fuel to be used will depend upon its availability and its degree and ease of oxidation in the presence of the particular electrolyte. In any event, the fuel should not react directly with the electrolyte or with the materials of cell construction.

The oxidizing agents that can be used are preferably air and pure oxygen. Other oxidants which might be considered include a nitrogen oxide such as nitric oxide or nitrogen dioxide, sulfur dioxide, chlorine, liquid hydrogen peroxide, liquid organic peroxides, nitric acid, etc. As with the fuels, some of these oxidants will be more useful with particular electrolytes and cathode catalysts than with others.

It may be advantageous to use some of these oxidants in conjunction with a reducible salt dissolved in the electrolyte. A preferred system employing oxygen as the oxidant and cupric chloride dissolved in a hydrochloric acid electrolyte is disclosed in U.S. patent application Ser. No. 609,776, filed Jan. 17, 1967 to L. H. Cutler

CATHODES

The cathode should be an electrical conductor, which will accept electrons and will provide a surface for the electrode reaction with or without the presence of a catalyst. Suitable electrodes meeting these requirements are well known and many are described for example in "Catalysis, Inorganic and Organic," Berkman, Morrel, and Egloff, Reinhold Publishing Co., New York (1940). Suitable electrode materials include electrodes formed from metals of Group VIII of the Periodic Table such as rhodium, palladium, iridium and platinum. In addition to the electrodes formed of these metals, the electrodes can be formed of platinum or palladium black which is deposited on a base metal such as stainless steel, iron, nickel and the like. In addition, suitable electrodes may be formed from the metal-silicon combination described in U.S. patent application Ser. No. 404,435, filed Oct. 16, 1964, or from metal oxides or from carbon which is activated with platinum or palladium. The preferred cathode materials for use with the previously disclosed cupric chloride-hydrochloric acid catholyte systems are those relatively inexpensive materials disclosed with reference to the anodes, e.g., tantalum, carbon, etc.

The electrode materials may be used in sheet form or in the form of screens, meshes, or porous metals. They may be combinations of solid electrodes coated with porous catalysts bound with organic materials and plastics. It is also possible to use a combination cathode and solid oxidant. For example, the lead dioxide plate such as used in a storage battery may be used in the fuel cell of the invention; or, at least as a means for testing the effectiveness of fuels in the presence of the anodes and catalysts of the invention.

The temperature of operation of the fuel cell can range from about 20° C. to about 150° C., the pressure being atmospheric or slightly above to raise the boiling point of the electrolyte. In general, more current can be drawn from a fuel cell at a constant potential when the temperature is increased. However, at temperatures above about 150° C. the corrosive action of the acidic electrolyte on metals in the fuel cell is accelerated.

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follow. These examples should not be considered to limit the invention in any way. Parts and percentages in the examples are by weight, unless otherwise stated.

EXAMPLE 1

Ammonium heptamolybdate, $(NH_4)_6Mo_7O_{24} \cdot 4H_2O$, and elemental sulfur were mixed in a 5.5-to-1 weight ratio. The mixture was put into an alumina combustion boat which in turn was inserted into a quartz tube in a tubular furnace. The mixture was heated to a temperature of 450° C. in a hydrogen atmosphere to produce a powder. The powder was acid-insoluble and the ratio of oxygen-to-sulfur in the powder was 10:1. The powder was then mixed with 20% by volume of a polyimide powder and the mixture was pressed onto a tantalum screen using 100,000 p.s.i. to form the electrode. The tantalum screen was 1″ in diameter.

The electrode was operated as an anode in a fuel cell using lead dioxide as both oxidant and cathode, the exposed anode area being approximately 10 cm.² The electrolyte was an aqueous solution containing 10 weight percent sulfuric acid and the cell was operated at 60° C. The anode was evaluated by comparing its activity in the absence of a fuel to its activity when such fuels as methanol, formaldehyde and formic acid at fuel concentrations of 3 percent by volume were fed to the anode. The results are presented in the following table:

|  | Anode Potential vs. Saturated Calomel Electrode (volts) | | | |
| --- | --- | --- | --- | --- |
| Current Density (Milliamperes/cm.²) | No fuel | Methanol | Formaldehyde | Formic acid |
| 0.0 | +0.22 | +0.2 | +0.09 | +0.00 |
| 0.4 | (*) | +0.75 | +0.18 | +0.08 |
| 10 | (*) | (*) | +0.77 | +0.40 |

*Cannot obtain stated current density.

The inability to draw any significant amount of current in the absence of a fuel shows that the electrode was not being oxidized. Instead, the current obtained in the presence of the fuels was due to the catalytic material on the electrode.

As further confirmation of the substantial catalytic activity of the electrode, the fuel cell was tested using only the tantalum screen as the anode and formaldehyde as the fuel. The following data were obtained:

| Current Density (Milliamperes/cm.²) | Anode Potential vs. Saturated Calomel Electrode (volts) | |
|---|---|---|
| | No fuel | Formaldehyde |
| 0 | +0.2 | [1] +0.26 |

[1] A maximum of 1.5 microamperes could be drawn.

Control experiments were performed wherein molybdenum dioxide powder and molybdenum disulfide powder were each mixed with polyimide powder and fabricated into electrodes as in Example 1. The electrodes were tested as anodes in a fuel cell with and without fuel (formaldehyde) as described in Example 1. No catalytic activity was observed when the anode contained molybdenum dioxide. Some catalytic activity was obtained, when the anode contained molybdenum disulfide, the level of catalytic activity being substantially less than that obtained using the anode of Example 1.

EXAMPLE 2

Ninety-eight grams of $(NH_4)_6Mo_7O_{24} \cdot 4H_2O$ was reacted with 18.3 grams of elemental sulfur at 450° C. in a hydrogen atmosphere for seven hours. The acid-insoluble product, analyzing 70% Mo, 11% S, and 19% O (oxygen-to-sulfur ratio of 2:1), was mixed with polyimide polymer and fabricated into an electrode as in Example 1. The electrode was tested as an anode in a fuel cell as in Example 1 using formaldehyde as the fuel and the sulfuric acid electrolyte. With no fuel present, the open circuit potential was +0.14 volt and the limiting current was 39 milliamps. Upon adding the formaldehyde fuel to the anode, the open circuit potential dropped to −0.16 volt and the limiting current increased to 120 milliamps.

EXAMPLE 3

Twenty-five grams of $MoO_3$ and 12.5 grams of elemental sulfur were thoroughly mixed and heated to 450° C. in a hydrogen atmosphere for seven hours. The acid-insoluble particulate product, having an oxygen-to-sulfur ratio of 1:2, was fabricated into an electrode as in Example 1.

The electrode was tested as the anode in a fuel cell as in Example 1 using formaldehyde as the fuel and the sulfuric acid electrolyte. With no fuel present, the open circuit potential was +0.29 volt and the limiting current was 1.6 milliamps. Upon the addition of formaldehyde as the fuel, the open circuit potential dropped to +0.15 volt and the limiting current increased to 8.1 milliamps.

EXAMPLE 4

The Mo—O—S powder prepared substantially as in Example 2 using 25 grams of each of the reactants (oxygen-to-sulfur ratio of 1:3) was placed in a 1″ diameter gas dispersion tube. An electrical lead was obtained by pressing a tantalum wire against the powder. The dispersion tube was placed in the anolyte of a two-compartment cell, separated by a cation exchange membrane. Saturated calomel was used as the reference electrode; lead dioxide was used as the cathode; and a 10 percent aqueous solution of sulfuric acid was employed as the electrolyte. The cell was maintained at 70° C.

The following results were obtained when helium (a non-fuel) and hydrogen (a fuel) were successively bubbled through the dispersion tube:

| | Anode Potential vs. Saturated Calomel Electrode (volts) | |
|---|---|---|
| | Helium | Hydrogen |
| Current (Milliamperes): | | |
| 0 | +0.24 | −0.09 |
| 5 | +0.88 | −0.02 |
| 20 | (*) | 0.19 |
| 40 | (*) | 0.53 |
| 60 | (*) | 0.96 |

*Could not obtain stated current.

EXAMPLE 5

1.89 grams of Mo—O—S powder prepared as in Example 2 (oxygen-to-sulfur ratio of 2:1) was mixed with 0.195 gram of polyimide polymer. The mixture was pressed on a 1″ diameter tantalum screen at 75,000 p.s.i. to form an electrode. This electrode was tested in a manner similar to that described in Example 1. The anode reference voltage was not permitted to exceed +0.4 volt. The following results were obtained using formaldehyde as the fuel:

| Current (milliamperes): | Anode potential vs. saturated calomel electrode (volts) |
|---|---|
| 0 | −0.05 |
| 22.5 | −0.01 |
| 70 | +0.11 |
| 130 | +0.19 |
| 218 | +0.28 |
| 270 | +0.34 |
| 365 | +0.40 |

A polarization run was repeated after the cell was kept under load for two hours with the following results:

| Current (milliamperes): | Anode potential vs. saturated calomel electrode (volts) |
|---|---|
| 0 | −0.11 |
| 29 | −0.04 |
| 66 | +0.05 |
| 132 | +0.22 |
| 199 | +0.31 |
| 290 | +0.40 |

Even better results may be obtained by eliminating the polymer from fabrication of the anode. Instead the anode may be fabricated by mixing ⅛″ to ¹⁄₁₆″ lengths of tantalum wool with the Mo—O—S catalyst and cold compressing the mixture onto a tantalum screen to which a tantalum lead has been spot welded. The substitution of tantalum wool for the polymer decreases the resistance of the anode, thereby minimizing the IR polarization losses.

EXAMPLE 6

The Mo—O—S powder prepared as in Example 5 (oxygen-to-sulfur ratio of 2:1) was placed in a 1″ diameter gas dispersion tube with tantalum wool. Tantalum wire was used for the anode lead to this tube. A two compartment glass cell was used with parchment paper as the ion separator. An aqueous solution containing 35% potassium hydroxide was used as the anolyte at 65° C. and bright platinum metal was used as the cathode.

The following results were obtained from the cell when helium and hydrogen were bubbled through the gas dispersion tube:

| Current (Milliamperes): | Anode Potential vs. Saturated Calomel Electrode (volts) | |
|---|---|---|
| | No Fuel (Helium) | Hydrogen |
| 0 | −0.74 | −1.16 |
| 50 | −0.60 | −1.08 |
| 100 | −0.47 | −1.00 |
| 150 | (*) | −0.92 |
| 200 | (*) | −0.83 |
| 300 | (*) | −0.63 |
| 400 | (*) | +0.39 |

*Could not obtain stated current.

EXAMPLE 7

Two grams of Mo—O—S powder, prepared substantially as in Example 5 (oxygen-to-sulfur ratio of 2:1), was mixed with 1 gram of tantalum wool cut into $\frac{1}{16}''$ to $\frac{1}{8}''$ lengths and 0.2 gram of polytetrafluoroethylene. The mixture was cold compressed onto a 1″ diameter tantalum screen using 60,000 p.s.i. Electrical connection was obtained by spot welding a tantalum wire to the screen. A two compartment glass cell was used with parchment paper as a separator. An aqueous solution of 10% potassium hydroxide was used as the electrolyte. Bright platinum sheet was used as the dummy cathode. The cell was driven from a D.C. power supply and hydrazine was used as the fuel.

The following results were obtained:

| Current (Milliamperes): | Anode Potential vs. Saturated Calomel Electrode (volts) | | |
|---|---|---|---|
| | Blank at 25° C. | With Hydrazine Hydrate at 25° C. | With Hydrazine Hydrate at 50° C. |
| 0 | +0.83 | −1.09 | −1.10 |
| 25 | (*) | −0.92 | −1.02 |
| 50 | (*) | −0.78 | −0.94 |
| 100 | (*) | −0.60 | −0.80 |
| 200 | (*) | (*) | −0.63 |
| 300 | (*) | (*) | −0.53 |

*Could not obtain the stated current.

The decrease in potential when hydrazine is used as a fuel and the higher currents obtained are indicative of catalytic activity.

EXAMPLE 8

Mo—O—S powder which was acid insoluble and having an oxygen-to-sulfur ratio between 10:1 and 1:3 was placed in a 1″ diameter gas dispersion tube and tested as a catalyst material for the anode in the manner described in Example 4.

The following results were obtained when helium and carbon monoxide were successively bubbled through the dispersion tube:

| Current (Milliamperes): | Anode Potential vs. Saturated Calomel Electrode (volts) | |
|---|---|---|
| | Helium | Carbon Monoxide |
| 0 | +0.30 | −0.07 |
| 25 | +0.39 | +0.01 |
| 50 | +0.47 | +0.09 |
| 100 | (*) | +0.26 |
| 150 | (*) | +0.45 |

*Could not obtain stated current.

EXAMPLE 9

The Mo—O—S powder of Example 8 was placed in a 1″ diameter gas dispersion tube and tested as in Examples 4 and 8 using reformed natural gas as the fuel. Nitrogen was used as the non-fuel control. The reformed natural gas had the following nominal composition: 74% hydrogen; 6% methane; 3% carbon monoxide; and 17% carbon dioxide.

The following results were obtained when the fuel and the non-fuel were successively bubbled through the dispersion tube:

| Current (Milliamperes): | Anode Potential vs. Saturated Calomel Electrode (volts) | |
|---|---|---|
| | Nitrogen | Reformed Natural Gas |
| 0 | +0.32 | −0.17 |
| 50 | +0.40 | −0.09 |
| 100 | (*) | −0.02 |
| 200 | (*) | +0.14 |
| 300 | (*) | +0.30 |
| 350 | (*) | +0.38 |

*Could not obtain stated current.

EXAMPLE 10

An acid-insoluble Mo—O—S powder having an oxygen-to-sulfur ratio between 10:1 and 1:3 was prepared as in Example 1. Two grams of the powder was mixed with 1.5 grams of tantalum wool and 0.2 gram of polytetrafluoroethylene powder. The mixture was pressed onto a 1″ diameter tantalum screen using 60,000 p.s.i. to form the anode. The anode was mounted in a polytetrafluoroethylene support and electrical contact was made by pressing a tantalum ring against the anode.

The cathode was a platinum-platinum black catalyst on a tantalum wire screen. The electrolyte was a 10 percent aqueous solution of sulfuric acid and a cation-exchange membrane was used to separate the anode from the cathode. Formaldehyde was used as the fuel and it was fed to the anode as a 37% aqueous solution using 70 ml. of the fuel solution per 300 ml. of the sulfuric acid solution. Oxygen was bubbled through the cathode.

The fuel cell was operated at 60° C. and 90° C. with the following results:

| Current Density (Milliamps/cm.²): | Voltage | |
|---|---|---|
| | At 60° C. | At 90° C. |
| 0 | +0.56 | +0.70 |
| 3.5 | +0.50 | +0.64 |
| 7.0 | +0.45 | +0.57 |
| 10.6 | +0.40 | +0.51 |
| 14.1 | +0.35 | +0.44 |
| 17.6 | +0.31 | +0.38 |
| 21.2 | +0.26 | +0.32 |
| 24.8 | +0.21 | +0.26 |

EXAMPLE 11

A fuel cell was constructed as in Example 10 except for the use of a 2.5 normal solution of hydrochloric acid as the electrolyte in place of the sulfuric acid solution. Seventy mls. of the 37% aqueous solution of formaldehyde per 300 ml. of the 2.54 hydrochloric acid solution was used.

The fuel cell was operated at 60° C. and 90° C. with the following results:

| Current Density (Milliamperes/cm.²): | Voltage | |
|---|---|---|
| | At 60° C. | At 90° C. |
| 0 | +0.56 | +0.58 |
| 3.54 | +0.42 | +0.49 |
| 7.00 | +0.29 | +0.41 |
| 9.55 | +0.20 | |
| 10.60 | | +0.33 |
| 14.10 | | +.24 |
| 15.90 | | +0.20 |

EXAMPLE 12

A porous graphite disc 1¼ inch diameter by ⅛ inch thick was placed in a muffle furnace and heated to 300° C. The disc was sprayed with a 25 wt. percent aqueous solution of $(NH_4)_6Mo_7O_{24} \cdot 4H_2O$, using helium as the propellant, until 0.38 gm. of the molybdate was deposited on one surface. The coated disc was then converted to a catalyzed electrode having an oxygen-to-sulfur ratio of about 36:1 by heat treatment for 1 hour at 400° C. in a H₂S atmosphere and then treated at 450° C. in a hydrogen atmosphere for 4 hours.

The electrode was tested as an anode in a fuel cell using formaldehyde as the fuel and a 10 wt. percent sulfuric acid solution as the electrolyte. The open circuit potential versus a standard calomel electrode was −0.15 bolt at 90° C. At +0.05 volt, the electrode delivered 21 amperes per ft.²

What is claimed is:

1. In a fuel cell comprising a housing, at least one fuel electrode, catalytic material associated with at least said fuel electrode, at least one oxidant electrode, at least one electrolyte, and connecting means associated with at least one fuel electrode and at least one oxidant electrode for establishing electrical contact with an external circuit, the improvement wherein the catalytic material associated with the fuel electrode comprises at least one acid-insoluble solid electrically conductive structure consisting essentially of at least one oxide of molybdenum and at least one sulfurated compound of molybdenum, said oxide having the formula $MoO_x$ wherein $x$ has a value of 2–2.88, at least a portion of the said solid structure being exposed to the electrolyte and containing said sulfurated compound of molybdenum, the ratio of oxygen-to-sulfur in said solid catalytic material being 36:1–1:36.

2. A fuel cell as in claim 1 wherein the ratio of oxygen-to-sulfur in said catalytic material is 10:1–1:3.

3. A fuel cell as in claim 1 wherein said catalytic material is associated with an electrically conductive base stratum.

4. A fuel cell as in claim 3 wherein said base stratum is a transition metal.

5. A fuel cell as in claim 3 wherein said base stratum is tantalum.

6. A fuel cell as in claim 3 wherein said base stratum is carbon.

7. A fuel cell as in claim 1 wherein said electrolyte is an acidic electrolyte.

8. In a fuel cell comprising a housing, at least one fuel electrode, catalytic material associated with at least said fuel electrode, at least one oxidant electrode, at least one electrolyte, and connecting means associated with at least one fuel electrode and at least one oxidant electrode for establishing electrical contact with an external circuit, the improvement wherein the catalytic material associated with the fuel electrode is the electrically conductive, acid insoluble solid product of reacting ammonium heptamolybdate and a sulfurizing compound in a reducing atmosphere, the oxygen-to-sulfur ratio in said product being 36:1–1:36.

9. A fuel cell in claim 8 wherein the ratio of oxygen-to-sulfur in said product is 10:1–1:3.

10. A fuel cell as in claim 8 wherein said catalytic material is the product of reacting ammonium heptamolybdate and a sulfurizing compound in a reducing atmosphere on an electrically conductive carbon surface.

11. A fuel cell electrode comprising an electrically conductive base stratum having applied thereto a catalytically effective amount of an acid-insoluble electrically conductive solid material consisting essentially of at least one oxide of molybdenum and at least one sulfurated compound of molybdenum, said oxide having the formula $MoO_x$, wherein $x$ has a value of 2–2.88, at least a portion of the said solid material being exposable to an electrolyte and containing said sulfurated compound of molybdenum, the ratio of oxygen-to-sulfur in said solid material being 36:1–1:36.

12. A fuel cell electrode as in claim 11 wherein the ratio of oxygen-to-sulfur in said solid material is 10:1–1:3.

13. A fuel cell electrode comprising an electrically conductive structure having incorporated therein a catalytically effective amount of an acid-insoluble electrically conductive solid material consisting essentially of at least one oxide of molybdenum and at least one sulfurated compound of molybdenum, said oxide having the formula $MoO_x$, wherein $x$ has a value of 2–2.88, at least a portion of the said solid material being exposable to an electrolyte and containing said sulfurated compound of molybdenum, the ratio of oxygen-to-sulfur in said solid material being 36:1–1:36.

References Cited

UNITED STATES PATENTS

| | | | |
|---|---|---|---|
| 3,104,263 | 9/1963 | Riemenschneider | 252—440 |
| 3,367,802 | 2/1968 | Rhodes | 136—120 |
| 3,393,100 | 7/1968 | Niedrach | 136—120 |

WINSTON A. DOUGLAS, Primary Examiner

PETER D. ROSENBERG, Assistant Examiner

U.S. Cl. X.R.

136—120; 252—465